Oct. 27, 1942.  R. N. FEICHT  2,299,744
DIRECT READING COMPUTER
Filed June 19, 1941  2 Sheets-Sheet 1

INVENTOR
ROBERT N. FEICHT
ATTORNEYS

Oct. 27, 1942.    R. N. FEICHT    2,299,744
DIRECT READING COMPUTER
Filed June 19, 1941    2 Sheets-Sheet 2

Patented Oct. 27, 1942

2,299,744

UNITED STATES PATENT OFFICE 2,299,744

DIRECT READING COMPUTER

Robert N. Feicht, Dayton, Ohio

Application June 19, 1941, Serial No. 398,843

4 Claims. (Cl. 235—61)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to computers, particularly to a device for computing and correlating several of the factors involved in aerial photography.

This art, as presently practiced, involves the taking and piecing together of a great many separate photographs, and the amount of terrain which may be covered by a single film depends, of course, on the relation between the film length, the focal length, and the plane altitude, the film length being the dimension of the film in the direction of flight, and the focal length being the distance between the focal plane and nodal point of the lens.

Since these factors enter largely into the calculations which must be made before the execution of an aerial map is attempted, it is an object of this invention to provide a computing device such that, when the film length and focal length are brought together on one part of the device, the ground measurement corresponding to any given altitude will be set up for direct reading on another part of the device.

Inasmuch as the altitudes, at which the art is practiced, vary over a wide range, it is another object of the invention to obtain greater accuracy by providing two altitude-computing means, the one for the lower, and the other for the higher altitudes.

Other objects and advantages will become evident as the invention is further described, reference being had to the drawings, wherein.

Figure 2:
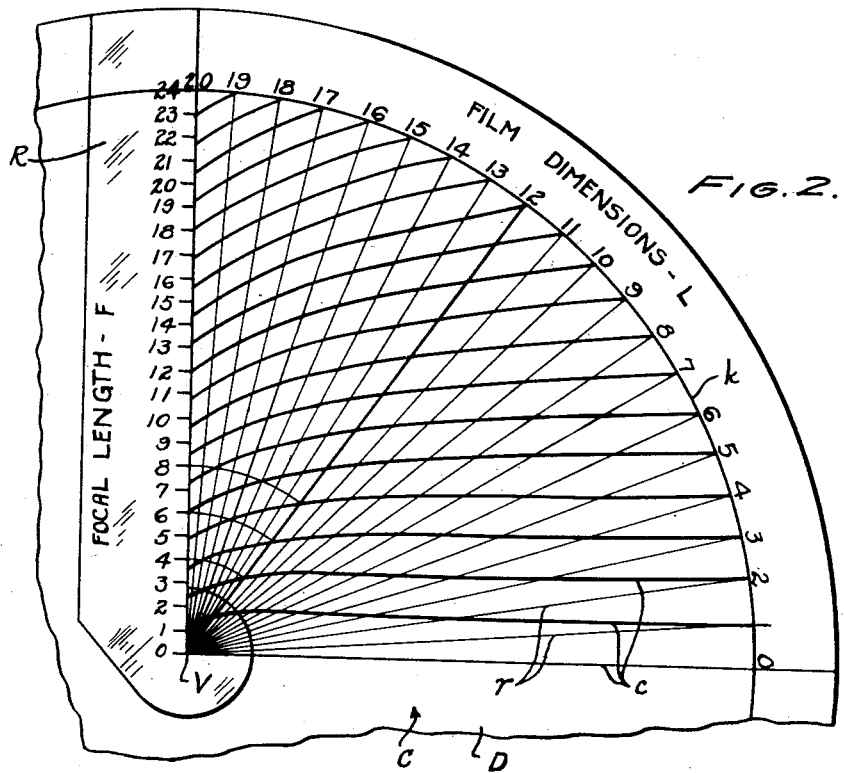
Fig. 2 is a view of one of the charts made to demonstrate the procedure followed in laying it out.

Since the several elements of the device are composed in part of a plurality of numerals, the elements are distinguished one from the other by reference characters consisting of letters of the alphabet.

Figure 1:
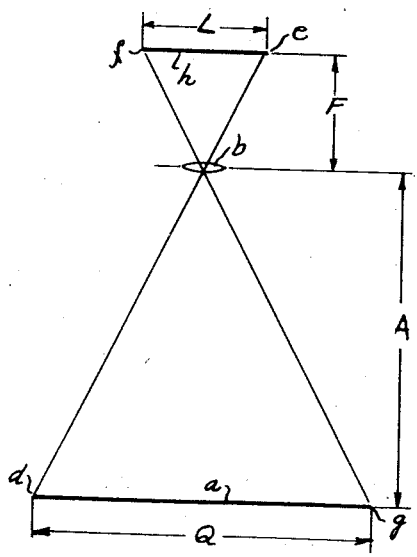
Fig. 1 is a diagram showing that the relation between the focal length and film length is the same as between the altitude and the terrain taken on one film.

Referring to the diagram Fig. 1, the letters $a$, $b$, and $h$ represent the relative positions of the ground, lens, and film respectively. L is the film length in inches, F is the focal length in inches, A is the altitude in feet, and Q is the length of the terrain in feet corresponding to the length L of a film.

Obviously, equal angles are included between the lines $d$—$e$ and $f$—$g$, above and below the line drawn through $b$, so $AL=FQ$. It follows that if a given relation exists between F and L, that same relation will exist between A and Q, that is, $F:L::A:Q$. Therefore if, for instance, an 8" film L has a 16" focal length F, a camera at an altitude of 5000 ft. will take a ground length Q of 2500 ft. on a single 8" film. Similarly, if a 4" film L has an 8" focal length F, the camera at the same altitude, 5000 ft., will also take a ground length Q of 2500 ft.

Since it is then a matter of relationship between F and L, and not of dimensions, which determines the value of Q for a given value of A, the charts and scales of the computer are so laid out that when any given value of F is set to a given value of L, all other values of F will automatically appear at those values of L which bear the same relationship to the other F values as the given L bears to the given F.

Expressed numerically, the scales and charts are so laid out that if a focal length L of 12" is set to a film length F of 4", the focal lengths 6", 9", 15", 18", etc., will appear opposite the film lengths of 2", 3", 5", 6", etc., respectively.

The manner in which such a device may be laid out is shown in Fig. 2, the chart C being laid out on a circular disc D, a part only of which is here shown. The chart extends over the 90 degrees of the arc $k$, although more or less than 90 degrees may be used if desired.

Assuming that the maximum film length L which will be used is 20", the quadrant $k$ is divided into twenty equal parts and the points of division given numerals 0 to 20 and labeled "Film dimensions—L." Radial lines $r$ are next drawn from the center V to each of the points of division. Next, each of the radial lines $r$ is divided into that number of equal parts which corresponds to the numeral to which the radial line extends. Finally, curved lines $c$ are drawn from the film dimension numbers to the V—20 radial line, the curve from any number N extending through the $n$th division, from the center V, of each and every radial line which it crosses in reaching the radial line V—20. Thus the curve $c$ which emanates from 10 will cross the radial lines V—11, V—12, V—13, etc., at the tenth division from V on each of the radial lines.

Assuming that the maximum focal length F which will be used is 24", a runner R, having its radial measurement V—24 corresponding exactly to the dimension V—20 on the quadrant, is provided, the runner being pivoted to swing about the center V and having one edge alignable with the line V—20. The distance V—24 on the runner may then be divided into twenty-four equal divisions, the points of division given numerals 1 to 24 progressing from the center toward the periphery and labeled "Focal lengths —F."

If now the 24" focal length is set to the 20" film dimension as shown, the 12" focal length will be at that one of the curves c which extends to the 10" film dimension. This naturally follows, since the curve c which extends from the 10" film dimension was drawn to the tenth division from V on the line V—20. With the runner so set, any selected film dimension L may be seen to have a focal length F which is in the ratio of 20/24. Thus the 5" film dimensions corresponds to the 6" focal length, the 15" film dimension to the 18" focal length, etc.

If the runner R is now shifted, as, for instance, to the line V—12, so that the 6" focal length F comes to that curved line c which extends to the 3" film dimension L, it will be seen that all other focal lengths F have a ratio of 6/3 to their film dimensions—that is, the 4" focal length is opposite the 2" film dimension, the 8" focal length is opposite the 4" film dimension, etc.

Since any position to which the runner R, Fig. 2, may be moved, sets up a definite ratio of F/L for all values of F and L, it follows that if a duplicate chart is placed in a fixed, angularly spaced-apart position from the first chart, and a duplicate runner is maintained in an angularly spaced-apart position from the first runner equal to that of the two charts, the same ratio will be set up as between values on the duplicate runner over values on the duplicate chart as the F/L ratios of the original runner and chart. Therefore if an additional chart and runner C1 and R1 are provided as in Fig. 3, and values of A, Fig. 1, are graduated on the runner R1, and proportionate values of Q are graduated on the chart C1, the ratio of the values of F/L, set up on the runner R and chart C, will always be the ratio of the A/Q, automatically set up on the runner R1 and chart C1.

Figure 3:
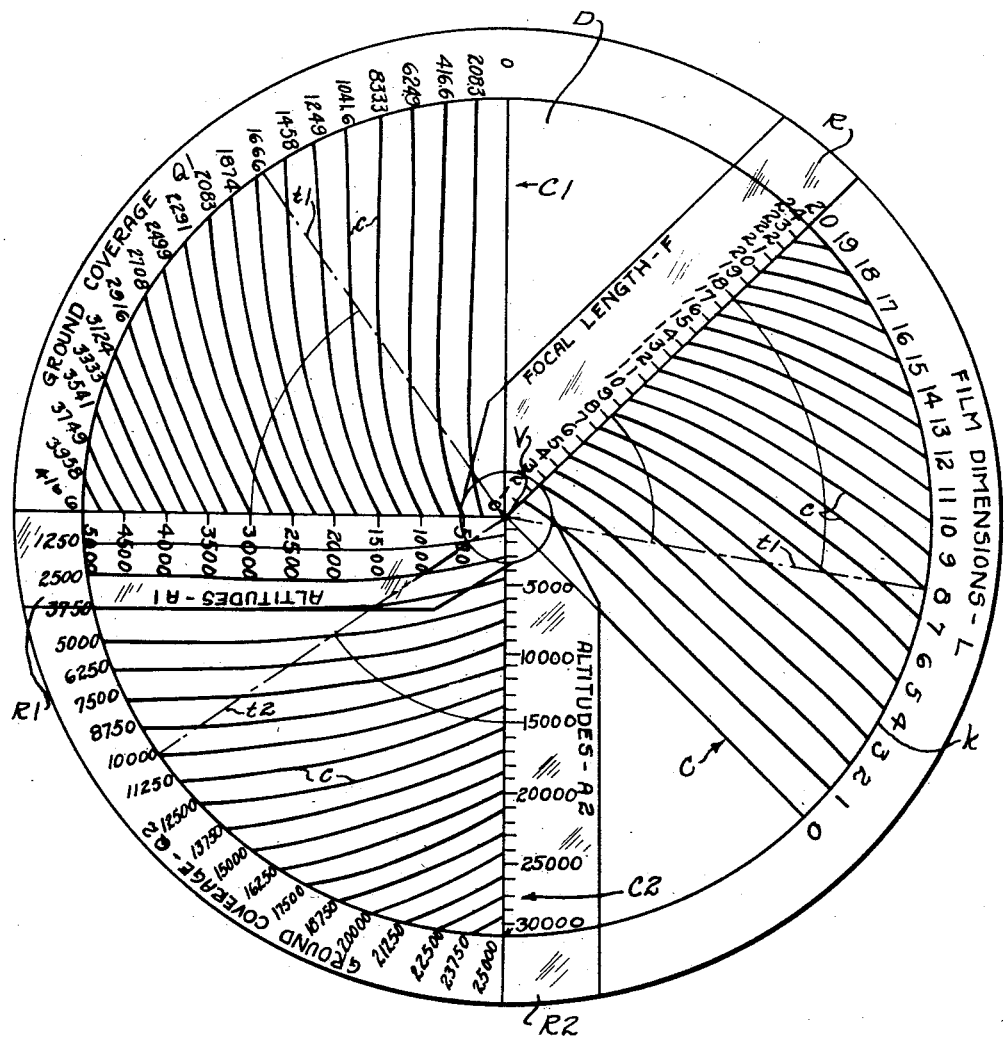
Fig. 3 is a plan view of the complete computer.

In Fig. 3, the C chart of Fig. 2 is shown on a complete circular base D and, on the same base, two charts C1 and C2 bear scales Q1 and Q2. Except as to values assigned them, the curves c of the C1 and C2 charts are duplicates of those of the C chart. The charts are so positioned on the disc D that one has its V—0 line 135 degrees anticlockwise, and the other, its V—0 line 135 degrees clockwise from the V—0 line of the C chart. In addition to the F runner R there are two A runners R1 and R2, the three being spaced so that the three graduated edges coincidently align with the V—0 lines of the three charts. The three runners may preferably be integral so that they may always maintain the same angular spacing, each with the others.

In order that the device may accurately cover the wide range of altitude desired, the altitude runner R1 has laid off on its graduated edge a distance equal to V—24 of the R runner, the mark showing this distance being numbered 5000 ft. The distance V—5000 is then divided by marks into ten spaces of 500 ft. each, the marks being designated by appropriate numerals and the entire scale called the A1 scale.

The altitude runner R2 also has the distance equal to V—24 of the R runner laid off on its graduated edge, the mark showing this distance on the R2 runner being numbered 30,000 ft. The distance V—30,000 is then divided by marks into thirty equal spaces of 1,000 ft. each, every fifth mark being designated by appropriate numerals, and the entire scale called the A2 scale.

If the graduated edge of the runner R is now brought into coincidence with the line V—20 of the C chart, so that a F/L ratio of 24/20 is set up on the C chart, automatically a 24/20 ratio is set up on the C1 and C2 charts, whereby 24/20 is the ratio of A/Q for both charts C1 and C2.

Since the runner R1 of the C1 chart must indicate a Q/A ratio of 20/24 in its present position—i. e., at the extreme end of the chart C1—and the maximum A on the A1 scale of the runner is 5,000 ft., the Q value for this position of the runner will be 5,000×20/24=4,166 ft., and, since the Q1 scale of the C1 chart is divided into twenty equal parts, each part will represent a Q1 value of 4,166/20=208.3 ft. Thus the first division from 0 on the Q1 scale will be 208.3 ft.; the second, 416.6 ft.; and the twentieth or last division, 4,166 ft.

Since the A2 scale on the runner R2 has a maximum A of 30,000 ft., the twentieth division on the Q2 scale will have a Q2 value of 30,000×20/24=25,000 ft. Each division will therefore represent 25,000/20=1,250 ft. The Q1 and Q2 scales are numbered accordingly in Fig. 3.

With the triple runner R, R1, and R2 set as shown in Fig. 3, it may be seen that if the camera has a 20" film at a focal length of 24", or a 10" film at a focal length of 12", or an 11¼" film at a focal length of 13½", or any other combination of $F:L::24:20$ appearing on the chart C, a photograph taken at an altitude of 5,000 ft. (see R1) will take in a space on the ground of 4,166 ft. (see Q1 and Q2), or if taken at 20,000 ft. (see R2) will have a ground coverage of 16,666 ft. (see Q2), or, to have a ground coverage of 3,125 ft. (see Q1) it must be taken from an altitude of 3,750 ft. (see R1).

Similarly, if the triple runner is shifted until the graduated edges of the legs R, R1, and R2 are respectively on the broken lines t, t1 and t2, it may be seen that if the camera has an 8" film at a focal length of 24", or a 6" film at a focal length of 18", or a 2¾" film at a focal length of 8¼", or any other combination of $F:L::24:8$ appearing on the chart C, a photograph taken at an altitude 3,000 ft. (see R1) will take in a space on the ground of 1,000 ft. (see Q1), or, to have a ground coverage of 5,000 ft. (see Q2) it should be taken at an altitude of 15,000 ft. (see R2).

The runner shown in Fig. 3 may, of course, not be shifted on a drawing as suggested, as it may in a model of the device, but the distances may be taken by a divider from the several runners and set off on the lines t, t1, and t2 to solve the examples given. It will, of course, be understood that where either the known values or those desired come between values designated on the charts, interpolation will be necessary.

While a single embodiment of the invention has been shown and described, it will of course be obvious that considerable modification in the structure may be made within the scope of the invention—as, for instance, the C1 chart with its Q1 scale and R1 runner may be omitted, and all calculations made on the C2 chart with the Q2 scale and R2 runner. The calculations so made will of course be slightly less accurate. For another instance, the charts, instead of embracing only 90 degrees of the complete disc D, may embrace as much as 180 degrees if there are only two charts, or 120 degrees if there are three. Other modifications may be envisioned within the scope of the appended claims.

I claim

1. A computer comprising, in combination, two equiangular sectoral charts wherein the arc subtended between the first and last or boundary radii of each chart is divided into a plurality of equal parts, and intermediate radii are drawn to the points of division, said points comprising arcuate scales, being numbered from 0 at the first boundary radius of each chart circumferentially, each radius being divided into that number of equal parts designated by the number at its point of intersection with its arc, and curves emanating from said points of intersection and extending through that point, counted from the center outward on each radius, which is represented by the number at the point of emanation of the curve from the arc, the two charts being secured together in angularly spaced relation with their vertices coincident, a duplex runner with angular spacing between the blades equal to that of the charts pivotally mounted at the vertices of the sectors, each blade having one edge alignable with the radii and having a graduated radial scale numbered from the vertex at the center outward, the graduation on the scales being such that when a number on one runner is placed on a selected curve on its chart, a number on the other runner will be at such curve on the other chart that the number from which the first said curve emanates is to the number from which the second said curve emanates, as the number of the first runner is to the number on the second runner.

2. A computer comprising, in combination, a plurality of equiangular sectoral charts wherein the arc subtended between the first and last or boundary radii of each chart is divided into a plurality of equal parts, and intermediate radii are drawn to the points of division, said points comprising arcuate scales, being numbered from 0 at the first boundary radius of each chart circumferentially, each radius being divided into that number of equal parts designated by the number at its point of intersection with its arc, and curves emanating from said points of intersection and extending through that point counted from the center outward on each radius, which is represented by the number at the point of emanation of the curve from the arc, the several charts being angularly positioned and secured together with their vertices coincident, a multiple bladed runner with blades having the same angular spacing as the charts pivotally mounted at the vertices of the sectors, each blade having one edge alignable with the radii and having a graduated radial scale numbered from the vertex at the center outward, the graduations on the scales being such that when a number on any blade is placed on a selected curve on its chart, numbers on the other blades will be at such curves on their respective charts that the number from which the first said curve emanates is to the numbers from which the other curves emanate as the number on the first blade is to the numbers on the other blades.

3. A computer for aerial photography comprising, in combination, first and second sectoral charts wherein the arc subtended between the first and last or boundary radii of each chart is divided into a plurality of equal parts, said parts on the first chart representing the dimensions of films used in said photography, and said parts on the second chart representing the distance on the ground embraced by one of said films, and wherein intermediate radii are drawn to the points of division, said points comprising arcuate scales, each being numbered from 0 at the first boundary radius circumferentially, each radius being divided into that number of equal parts designated by the number at its point of intersection with its arc, and curves emanating from said points of intersection and extending through that point, counted from the center outward on each radius, which is represented by the number at the point of emanation of the curve from the arc, the two charts being angularly spaced and fixed with their vertices coincident, a duplex runner having first and second blades angularly spaced to correspond to the angular spacing of the two charts, pivotally supported at the said vertices, each blade having a graduated scale at one edge alignable with the radii, the scale on the first blade having divisions representing the focal lengths of the cameras used and the scale on the second blade having divisions representing the altitudes flown, the graduation on the scales being such that, in any position of the blades, values of focal lengths are to values of film lengths as values of altitude are to values of ground embraced.

4. A computer for use in aerial photography, comprising three angularly spaced sectoral charts with vertices coincident, the arc subtended by the first and last or boundary radii of each chart being divided into a plurality of equal parts and intermediate radii drawn to the points of division, said points comprising an arcuate scale, being numbered from 0 at the boundary radius of each chart circumferentially, each radius being divided into that number of equal parts designated by the number at its point of intersection with the arc, and curves emanating from said points of intersection and extending through that point, counted from the center outward on each radius, which is represented by the number at the point of emanation of the curve from the arc, and a triple runner comprising three integral blades angularly spaced to correspond to the spacing of the charts, and pivotally supported at the vertices of said charts, each blade having one edge alignable with the radii and graduated from the pivotal point outward, the divisions of the first, second and third arcuate scales representing respectively the range of film dimensions, the ground embraced by a film at low altitude, and the ground embraced by a film at high altitude, and the radial scales on the corresponding blades representing respectively the focal lengths of the cameras, the range of low altitudes and the range of high altitudes at which photographs are taken.

ROBERT N. FEICHT.